United States Patent
Lafont

(10) Patent No.: US 8,573,936 B2
(45) Date of Patent: Nov. 5, 2013

(54) BLADE FOR TURBOMACHINE RECEIVING PART, COMPRISING AN AIRFOIL PART INCLUDING A MECHANICAL FUSE

(75) Inventor: Lauren Lafont, Pechbusque (FR)

(73) Assignee: Airbus Operations S.A.S., Toulouse (FR)

( * ) Notice: Subject to any disclaimer, the term of this patent is extended or adjusted under 35 U.S.C. 154(b) by 605 days.

(21) Appl. No.: 12/708,237

(22) Filed: Feb. 18, 2010

(65) Prior Publication Data
US 2010/0215498 A1 Aug. 26, 2010

(30) Foreign Application Priority Data
Feb. 20, 2009 (FR) ........................ 09 51112

(51) Int. Cl.
*F01D 5/14* (2006.01)
(52) U.S. Cl.
USPC ........................................... 416/2; 416/223 R
(58) Field of Classification Search
USPC ............ 416/2, 43, 204 R, 229 R, 223 R, 232, 416/239, 210 A, 210 R, 213 R, 226
See application file for complete search history.

(56) References Cited

U.S. PATENT DOCUMENTS

| | | | | | |
|---|---|---|---|---|---|
| 2,561,705 | A | * | 7/1951 | Lochman | 416/226 |
| 3,664,764 | A | * | 5/1972 | Davies et al. | 416/224 |
| 4,111,600 | A | | 9/1978 | Rothman et al. | |
| 4,784,575 | A | * | 11/1988 | Nelson et al. | 416/226 |
| 7,780,410 | B2 | * | 8/2010 | Kray et al. | 416/1 |
| 7,794,197 | B2 | * | 9/2010 | Thompson et al. | 415/9 |
| 8,033,790 | B2 | * | 10/2011 | Vance | 416/97 R |
| 2008/0042008 | A1 | * | 2/2008 | Diochon et al. | 244/54 |
| 2008/0142641 | A1 | * | 6/2008 | Moore et al. | 244/215 |
| 2008/0258005 | A1 | * | 10/2008 | Gall et al. | 244/55 |
| 2010/0054938 | A1 | * | 3/2010 | Beckford et al. | 416/2 |

FOREIGN PATENT DOCUMENTS

| | | |
|---|---|---|
| DE | 698 674 | 11/1940 |
| DE | 39 17 034 A1 | 12/1989 |
| DE | 198 20 323 A1 | 11/1999 |
| WO | WO 93/08017 | 4/1993 |

* cited by examiner

*Primary Examiner* — Nathaniel Wiehe
*Assistant Examiner* — Aaron Jagoda
(74) *Attorney, Agent, or Firm* — Oblon, Spivak, McClelland, Maier & Neustadt, L.L.P.

(57) ABSTRACT

A blade for an aircraft turbomachine receiving part including a root, and an airfoil part prolonging this root. The airfoil part includes a mechanical fuse located at a distance from the bottom of the blade, along the length direction of the airfoil part, between 0.25 and 0.5 times the length of the airfoil part along this length direction.

8 Claims, 3 Drawing Sheets

BLADE FOR TURBOMACHINE RECEIVING PART, COMPRISING AN AIRFOIL PART INCLUDING A MECHANICAL FUSE

TECHNICAL DOMAIN

This invention relates in general to blades fitting into a receiving part for an aircraft turbomachine. It is particularly applicable to turbojets, turboprops and turbomachines referred to as <<open rotor>>.

STATE OF PRIOR ART

Normally, such a blade has a root prolonged by an airfoil part that will be in the airstream of the turbomachine. The design is arranged to give acceptable stiffness, particularly through a hollow structural core forming a caisson provided within the airfoil part. Nevertheless, in case of shocks applied to the airfoil part, for example caused by a bird in flight or subsequent to the development of a fatigue crack, the part of the airfoil separated from the rest of the blade is usually a very large part of the airfoil or even all of it. The mass of the debris derived from the separated part is then large. This may be a major disadvantage considering that the debris could strike the fuselage of the aircraft, with a kinetic energy that increases with the mass. The consequences on the integrity of the fuselage to which such a shock supplied may be disastrous.

SUMMARY OF THE INVENTION

Therefore, the purpose of the invention is to propose a blade that at least partially overcomes the disadvantage mentioned above applicable to embodiments according to prior art.

To achieve this, the object of the invention is a blade for an aircraft turbomachine receiving part comprising a root and an airfoil part prolonging said root, this airfoil part including a mechanical fuse located at a distance from the bottom of the blade along the length direction of the airfoil part, between 0.25 and 0.5 times the length of said airfoil part along this length direction.

With the blade according to the invention, the airfoil part will tend to break at its mechanical fuse if shocks on the airfoil part occur, for example caused by a bird during flight of the aircraft. Consequently, the part of the airfoil that could separate from the rest of the blade is smaller than what could occur in prior art. Therefore the mass of the debris formed from the separated portion is lower, and consequently can do less damage following an impact on the fuselage, due to its lower kinetic energy.

Preferably, said distance is equal to approximately 0.3 times the length of said airfoil part along its length direction. With such a layout, the portion of the airfoil part that could separate is then only 70% of the length of the airfoil part along the length direction.

Preferably, said airfoil part comprises a part forming a bowl, the head of which is located within an aerodynamic shell of this airfoil part, and the stem of which is composed by a junction with a reduced cross-section rigidly connecting the airfoil part to the root, said shell also surrounding a hollow structural core extending along the length direction and located within the external radial continuity of said bowl head with which it is fixed, and said mechanical fuse is formed by the interface between said hollow structural core and said bowl head. Nevertheless, any other mechanical fuse design could be envisaged without going outside the framework of the invention.

It is also noted that the blade could also include one or several other mechanical fuses in the portion located radially outwards from the mechanical fuse according to the invention.

In the configuration described above, it is preferably arranged such that the attachment between said hollow structural core and said bowl head is made using a sleeve surrounding their ends that bear on each other, although any other manner could be envisaged without going outside the framework of the invention.

Preferably, said root is separated into two root portions one mounted on the other, each extending over the entire length of said root.

Consequently, if a failure occurs on one of the two portions of the blade root, such a crack, a corrosion development, a fatigue crack or delamination, it can only propagate within the portion of the root in which it originated. Consequently, the other root portion is advantageously not impacted by this failure, and it can therefore continue to hold the blade in contact with the hub, which significantly reduces risks of the blade being lost. In other words, this design prevents a crack, a corrosion development, a fatigue crack or delamination from propagating transversely throughout the blade root, each of the two root portions thus backing up the other portion, and therefore fulfilling a safety function in case of failure, also called a <<Fail Safe>> function.

Note that these two root portions may indifferently form all or part of the blade root.

Preferably, said two root portions are identical.

Preferably, said root has an external surface generally forming a surface of revolution about a given axis, the contact interface between said two root portions containing said given axis.

In such a case, it is preferably arranged that said contact interface containing said given axis is approximately plane.

Similarly, said part forming a bowl is preferably separated into two bowl portions one mounted on the other, each extending over the entire length of said bowl. Once again, if a failure such as a crack, a corrosion development, fatigue crack or delamination occurs on one of the two portions of bowl, it can only propagate within the portion of the bowl in which it originated. Consequently, the other bowl portion is advantageously not affected by this failure, and therefore can continue to participate in holding the blade onto the hub, which significantly reduces the risks of blade losses. In other words, the design prevents a crack, a corrosion development, a fatigue crack or delamination from propagating transversely entirely through the entire bowl, each of the two bowl portions thus backing up the other portion and therefore fulfilling a safety function in case of failure, also a <<Fail Safe>> function.

Preferably, said two bowl portions are identical.

Preferably, the general shape of the external surface of said part forming a bowl is thus a surface of revolution also along said given axis, the contact interface between said two bowl portions containing said given axis.

In this configuration, it is arranged such that said contact interface integrating said given axis is approximately plane.

Finally, each bowl portion is advantageously made in a single piece with one of the two root portions.

Another purpose of the invention is turbomachine for an aircraft comprising a receiving part equipped with a plurality of blades as described above.

Preferably, the turbomachine is a turbojet, turboprop or an open rotor. Thus in the case of the turbojet, the blades are the fan blades, while in the other two cases they are propeller blades.

Finally, another purpose of the invention is an aircraft comprising a plurality of turbomachines like that mentioned above.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION OF PREFERRED EMBODIMENTS

Figure 1:
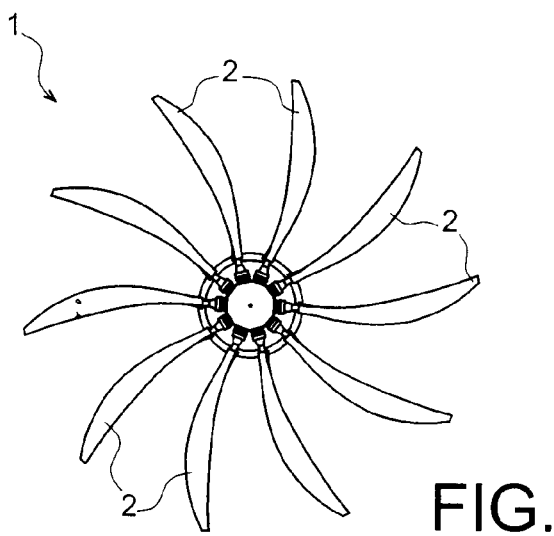
FIG. 1 represents a partial front view of a propeller containing a plurality of blades according to the invention.

FIG. 1 shows a part of a receiving part of an open rotor type turbomachine, this receiving part corresponding to a propeller 1 equipped with a plurality of blades 2. For guidance, such a turbomachine comprises two counter rotating propellers, in a known manner, for example with the first fixed in rotation to a first free power turbine, and the second propeller fixed in rotation to a second free power turbine located on the downstream side of the first.

Figure 2:
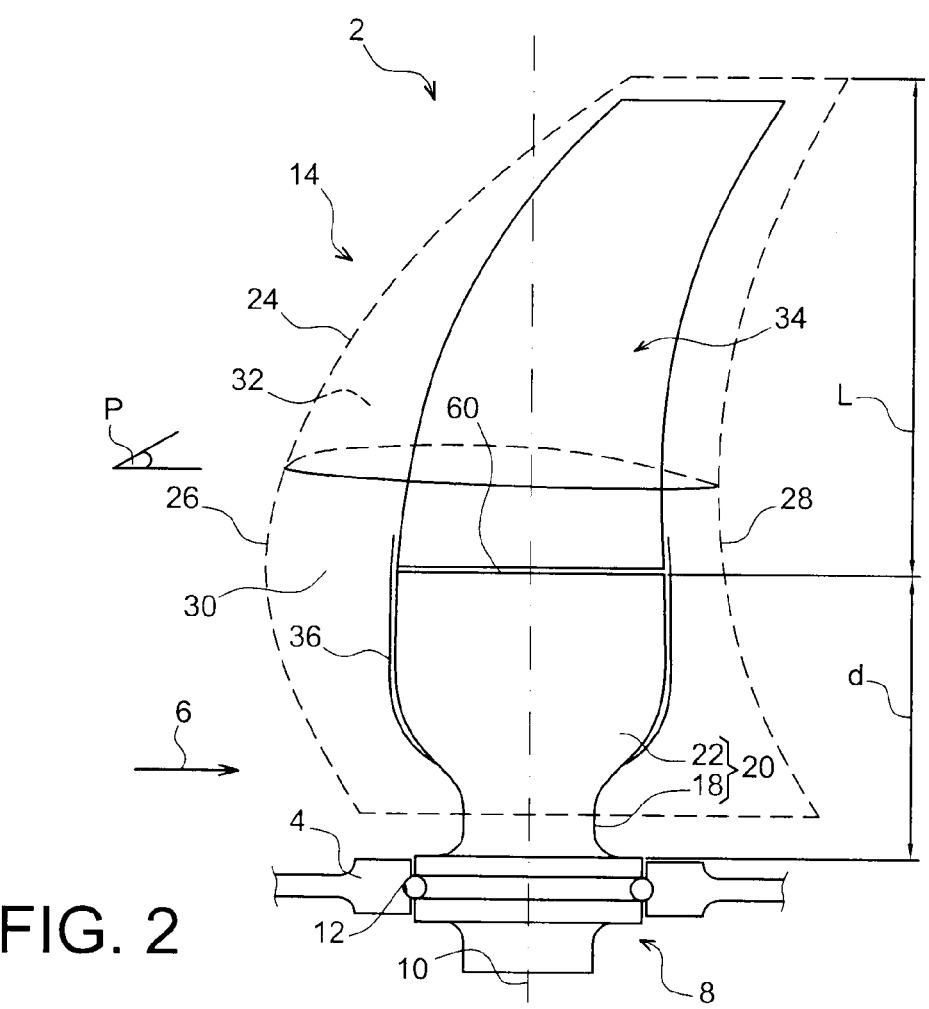
FIG. 2 shows a diagrammatric view of one of the propeller blades in FIG. 1, the blade being in the form of a first preferred embodiment of this invention.

FIG. 2 shows one of the propeller blades 2 in the form of a first preferred embodiment of this invention. It is designed to be mounted free to rotate on a hub, this hub participating in delimiting the airstream 6. To achieve this, the blade 2 comprises a root 8 mounted rotating on the hub 4 about an axis 10, for example by means of a ball bearing system 12. In this way, it can continuously pivot during operation of the turbomachine to obtain the required incidence, by means of an appropriate variable pitch system (not shown) judiciously cooperating with the blade 2.

The root 8 extends radially outwards as far as the airstream 6. The blade also comprises an airfoil part 14 located in the airstream, containing a mechanical junction 18 with a small cross-section that connects it to the root 8. In this request, as shown on FIG. 2, this junction 18 may form an integral portion of a part forming the bowl 20, the head 22 of which is housed within the airfoil part 14, and for which the stem of the bowl is composed of this reduced section junction 18. The bowl 20 may also be made in a single piece with the root 8, for example made of a composite material, preferably comprising a mix of glass and/or carbon fibres with the resin.

The airfoil part 14 has an aerodynamic shell 24 that forms the intrados 30 and the extrados 32 of the airfoil between the leading edge 26 and the trailing edge 28. This shell is also preferably made in a single piece, for example from a composite material, preferably comprising a mix of glass and/or carbon fibres with the resin.

The shell 24 surrounds a hollow structural core 34 extending along the length direction of the airfoil, located in external radial continuity of the bowl head 22 to which it is fixed by a sleeve 36. By surrounding the two ends facing the head 22 and the core 34, this sleeve 36 helps to keep these end parts in contact with the other, and therefore to fix the head 22 and the core 34 to each other.

The bowl head 22 is also located in the aerodynamic shell 24, while the stem 18 is located outside this shell.

The core 34 extends very close to the distal end of the airfoil part, along the length direction.

Figure 3:
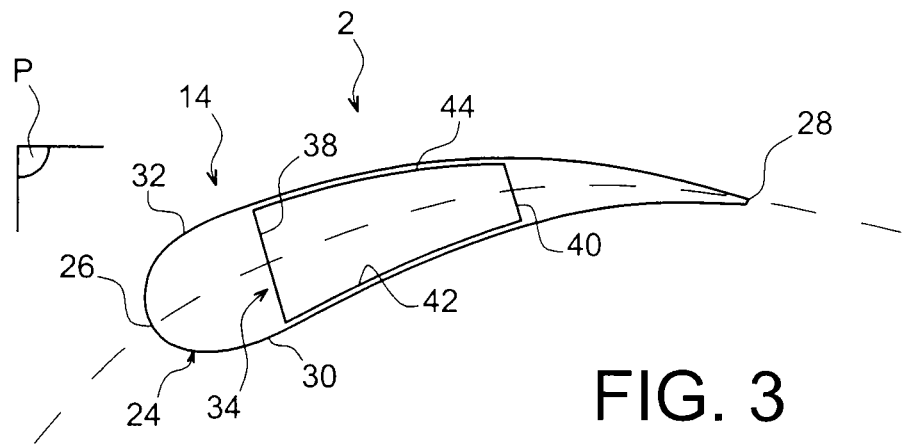
FIG. 3 shows a cross-sectional view of the blade shown on FIG. 2, along plane P on this same figure.

FIG. 3 shows that the cross-section of the core 34 forming the structural portion of the airfoil part is generally quadrilateral-shaped, composed of a first spar 38 facing a leading edge 26 but remaining at a distance from it, a second spar 40 facing towards a trailing edge 28 but remaining at a distance from it, a third spar 42 facing the intrados 30 and a fourth spar 44 facing the extrados 32.

As can be seen on FIG. 3, the third spar is arranged conventionally in contact with the intrados 30 of the shell, and the fourth spar 44 is arranged in contact with the extrados 32 of the same shell 34.

One of the special features of this invention lies in the fact that the interface 60 between the structural hollow core 34 and the bowl head 22 forms a mechanical fuse within the airfoil part 14. Thus, in the case of shocks in contact with the airfoil part, for example caused by a bird in flight, the airfoil part will tend to break at this mechanical fuse 60.

As shown diagrammatically on FIG. 2, the mechanical fuse 60 is located at a distance <<d>> from the blade root 8, along the length direction of the airfoil part 14 between 0.25 and 0.5 times the length <<L>> of the airfoil part 14 along this length direction, and even more preferably equal to 0.3 times this length. Note that in the example shown, the length direction can be considered to be the direction of the axis 10 of the root 8 and the bowl 20.

The interface 60 forming the mechanical fuse is preferably approximately plane, preferably orthogonal to the axis 10 as shown diagrammatically.

Figure 4:
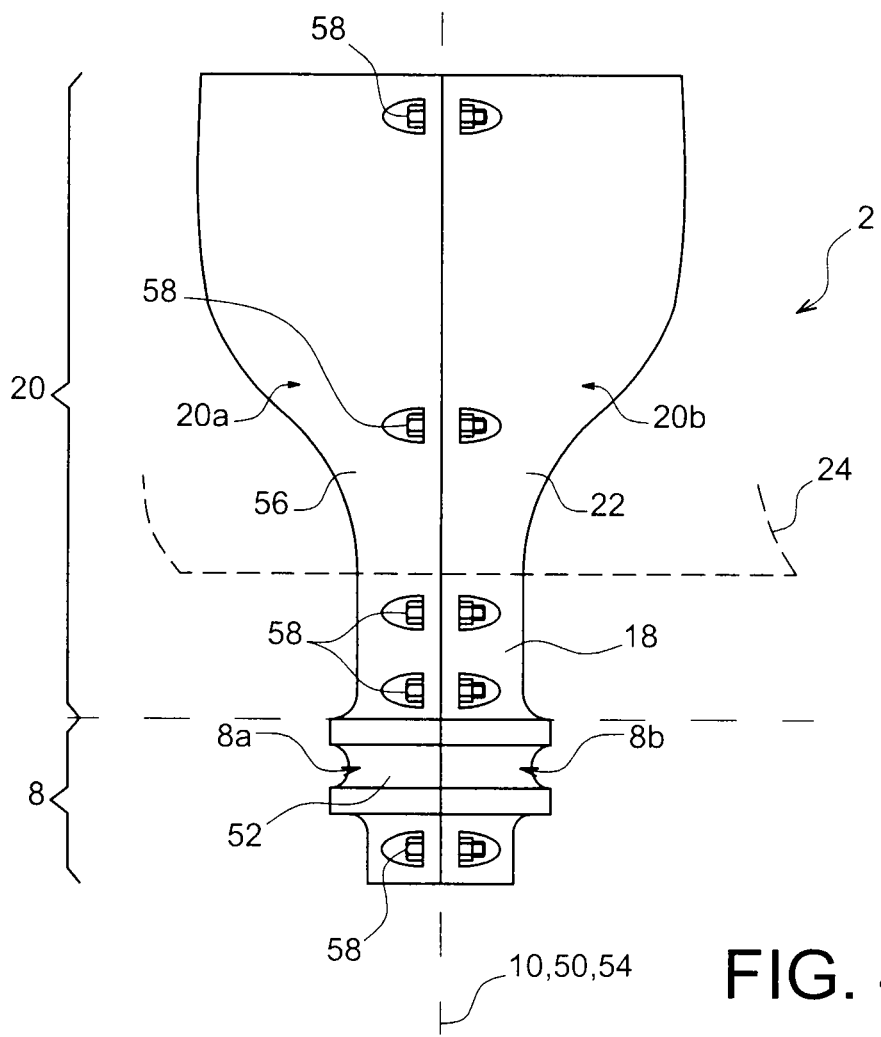
FIG. 4 shows a part of a blade in the form of a second preferred embodiment of this invention.

FIG. 4 shows part of a blade 2 according to a second preferred embodiment of this invention.

The blade 2 is similar to the blade described with reference to the previous figures. Note that on the figures, elements with the same numeric references correspond to identical or similar elements. It should also be noted that the only changes are to the part forming the bowl 20 and the root 8, the other elements of the blade described with reference to FIGS. 2 and 3 being unchanged.

One of the essential differences lies in the fact that the root 8 is no longer made from a single piece, but instead it is made from two root portions 8a, 8b each extending along the entire length of the root 8 along the direction of its axis 10 and fixed to each other. The two portions 8a, 8b are preferably identical and arranged symmetrically, and have a preferably plane contact interface 50 containing the axis 10. In this respect, note that the outside surface 52 of the root 8 is generally in the shape of a surface of revolution about the above mentioned axis 10. Thus, in the preferred embodiment described, each of the two root portions 8a, 8b that can be considered like a half-root, defines half of this outer surface 52.

Similarly, another difference lies in the fact that the bowl 20 is no longer made as a single piece, but by means of two bowl portions 20a, 20b each extending over the entire length of the bowl in the direction of its axis 10 and fixed to each other. The two portions 20a, 20b, preferably identical and arranged symmetrically, jointly define the bowl head 22 housed within the aerodynamic shell 24 of the airfoil part 14, and the bowl stem formed by the junction with the reduced section 18 fixing the airfoil part 14 to the root 8.

Figure 5:
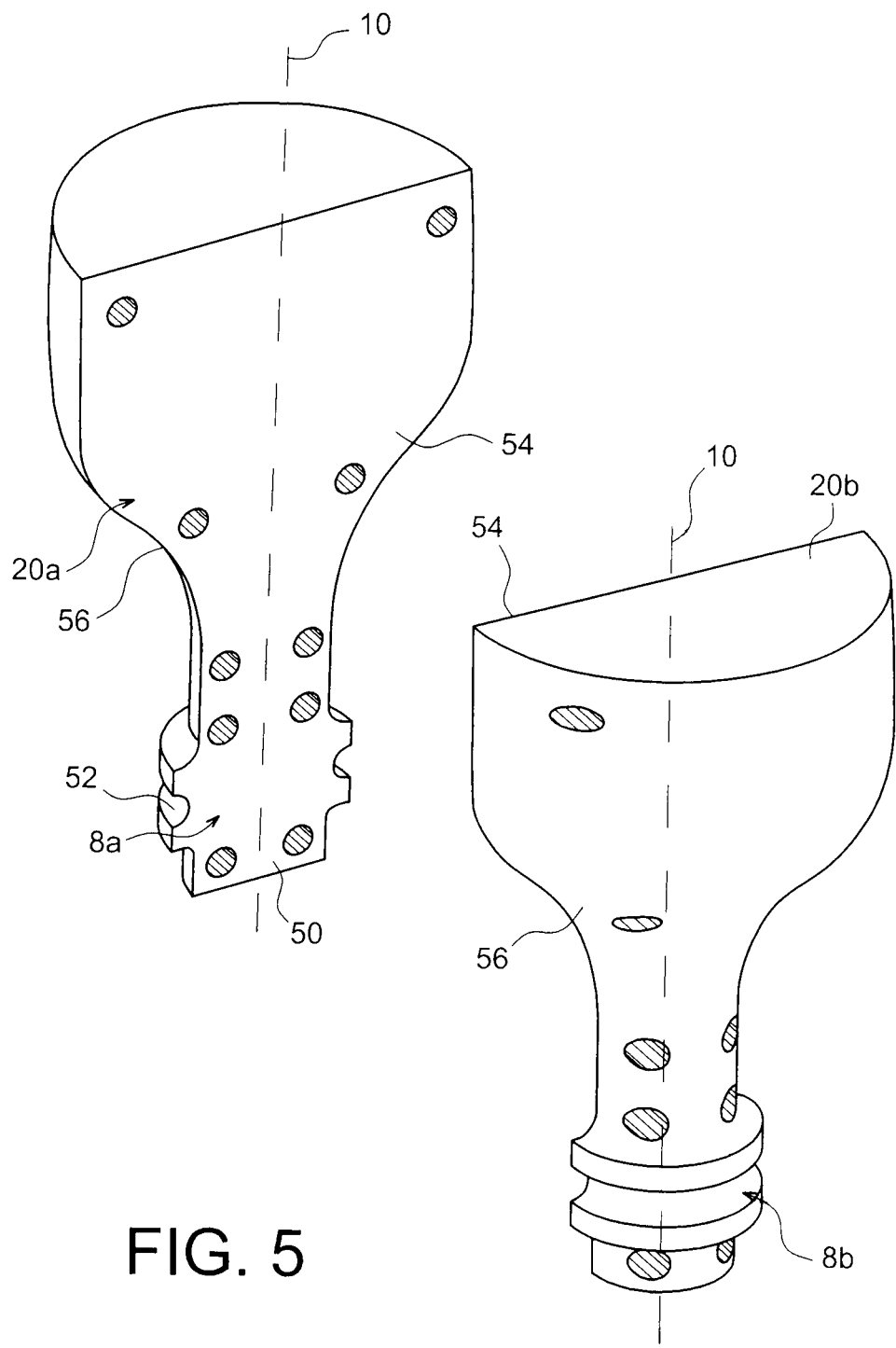
FIG. 5 shows an exploded perspective view of the blade part shown on FIG. 4.

The two portions 20a, 20b also comprise a preferably plane contact interface 54, also containing the axis 10. As can be shown on FIGS. 4 and 5, this interface 54 is preferably located in the contact interface plane 50 mentioned above, therefore this plane passing through the axis 10.

Note that the outside surface 56 of the bowl 20 has a generally shape of revolution with its axis being the above mentioned axis 10. Thus, in the preferred embodiment described, each of the two bowl portions 20a, 20b, that can be treated like a half-bowl, defines half of this external surface 56.

Preferably, the root portion 8a is made as a single piece with the bowl portion 20a that prolongs it, similarly the root portion 8b is made as a single piece with the bowl portion 20b that prolongs it. These two parts made of a composite material preferably comprising a mix of glass and/or carbon fibres with resin, are mounted one onto the other by means of conventional and preferably removable attachment means, for example bolts 58 or similar.

Obviously, an expert in the subject could make various modifications to the invention as described above solely as non-limitative examples.

The invention claimed is:

1. A blade for an aircraft turbomachine receiving part, comprising:
    a root; and
    an airfoil part prolonging said root, said airfoil part including an aerodynamic shell surrounding a hollow structural core,
    wherein said blade further includes a bowl with a head at a first end thereof and a stem extending from said bowl head, said bowl head being located in said shell and said bowl stem being located outside said shell, said bowl stem presenting a junction with a reduced cross-section connecting said airfoil part to said root,
    wherein said hollow structural core extends along a length direction of said airfoil part and is located in external radial continuity with said bowl head such that a first end of said hollow structural core faces said bowl head,
    wherein a sleeve surrounds said first end of said bowl and said first end of said hollow structural core, and
    wherein said airfoil part includes a mechanical fuse provided at an interface between said bowl head and said hollow structural core, and the mechanical fuse is located at a distance from a bottom of the blade along the length direction of the airfoil part, between 0.25 and 0.5 times the length of said airfoil part along the length direction.

2. The blade according to claim 1, wherein said distance is equal to approximately 0.3 times the length of said airfoil part along said length direction.

3. The blade according to claim 1, wherein said root is separated into two root portions, one mounted on the other, each extending over the entire length of said root.

4. The blade according to claim 1, wherein said airfoil part forming a bowl is separated into two bowl portions, one mounted on the other, each extending over the entire length of said bowl.

5. The blade according to claim 4, wherein said root is separated into two root portions, one mounted on the other, each extending over the length of said root, and each bowl portion of the two bowl portions is made in a single piece with one of two root portions of the root.

6. A turbomachine for an aircraft comprising a receiving part equipped with a plurality of blades according to claim 1.

7. An aircraft comprising a plurality of turbomachines according to claim 6.

8. The blade according to claim 1, wherein the mechanical fuse is a plane and is orthogonal to the length direction.

* * * * *